US012374998B2

(12) United States Patent
Konishi et al.

(10) Patent No.: US 12,374,998 B2
(45) Date of Patent: Jul. 29, 2025

(54) HIGH-VOLTAGE CONTROL CIRCUIT

(71) Applicant: Hitachi High-Tech Corporation, Tokyo (JP)

(72) Inventors: Satoshi Konishi, Tokyo (JP); Hiroshi Toda, Tokyo (JP); Naoya Ishigaki, Tokyo (JP); Kazuki Sato, Tokyo (JP)

(73) Assignee: Hitachi High-Tech Corporation, Tokyo (JP)

(*) Notice: Subject to any disclaimer, the term of this patent is extended or adjusted under 35 U.S.C. 154(b) by 239 days.

(21) Appl. No.: 18/203,357

(22) Filed: May 30, 2023

(65) Prior Publication Data

US 2023/0387806 A1  Nov. 30, 2023

(30) Foreign Application Priority Data

May 31, 2022  (JP) .............................. JP2022-088674

(51) Int. Cl.
*H02M 3/325*  (2006.01)
*H02M 1/14*  (2006.01)
*H02M 3/335*  (2006.01)

(52) U.S. Cl.
CPC ............. *H02M 3/335* (2013.01); *H02M 1/14* (2013.01)

(58) Field of Classification Search
CPC ......... H02M 3/325; H02M 3/335; H02M 1/14
See application file for complete search history.

(56) References Cited

U.S. PATENT DOCUMENTS

| 6,590,787 B2 * | 7/2003 | Yasumura ........... H02M 3/3385 363/97 |
| 7,305,065 B2 * | 12/2007 | Takahashi ................ H05G 1/12 378/104 |
| 7,492,612 B2 | 2/2009 | Hu et al. |

(Continued)

FOREIGN PATENT DOCUMENTS

| CN | 109152121 A | 1/2019 |
| CN | 111245403 A | 6/2020 |

(Continued)

OTHER PUBLICATIONS

Korean-language Office Action issued in Korean Application No. 10-2023-0068500 dated Jan. 24, 2025 with English translation (11 pages).

*Primary Examiner* — Adolf D Berhane
(74) *Attorney, Agent, or Firm* — Crowell & Moring LLP

(57) ABSTRACT

Provided is a high-voltage control circuit capable of shortening a time required for voltage bucking with a simple configuration without requiring a complicated control algorithm. A high-voltage control circuit 1 includes: a high-voltage rectifier circuit 100 configured to convert an AC voltage into a DC high voltage; a smoothing capacitor 140 configured to smooth the DC high voltage output from the high-voltage rectifier circuit 100; a switch circuit 102 connected in parallel to the smoothing capacitor 140; a feedback circuit 103 including an error amplifier 133 configured to amplify a differential voltage Vdf between a command voltage Viv and a divided voltage Vdv following the DC high voltage, and configured to control the high-voltage rectifier circuit 100 based on an output signal of the error amplifier 133; and an amplifier 105 configured to amplify the differential voltage Vdf. The switch circuit 102 is controlled by an output signal of the amplifier 105.

7 Claims, 6 Drawing Sheets

(56) References Cited

U.S. PATENT DOCUMENTS

| | | |
|---|---|---|
| 9,991,809 B2 | 6/2018 | Kikuchi et al. |
| 10,097,104 B2 | 10/2018 | Sasada et al. |
| 11,329,566 B2 | 5/2022 | Hirakawa |
| 2020/0186047 A1 | 6/2020 | Sen et al. |

FOREIGN PATENT DOCUMENTS

| | | |
|---|---|---|
| CN | 113206597 A | 8/2021 |
| JP | 2001-230098 A | 8/2001 |
| JP | 2016-36242 A | 3/2016 |
| JP | 2019-204751 A | 11/2019 |
| JP | 2020-22228 A | 2/2020 |
| KR | 10-2017-0102437 A | 9/2017 |
| TW | 200810341 A | 2/2008 |
| TW | 202015321 A | 4/2020 |

\* cited by examiner

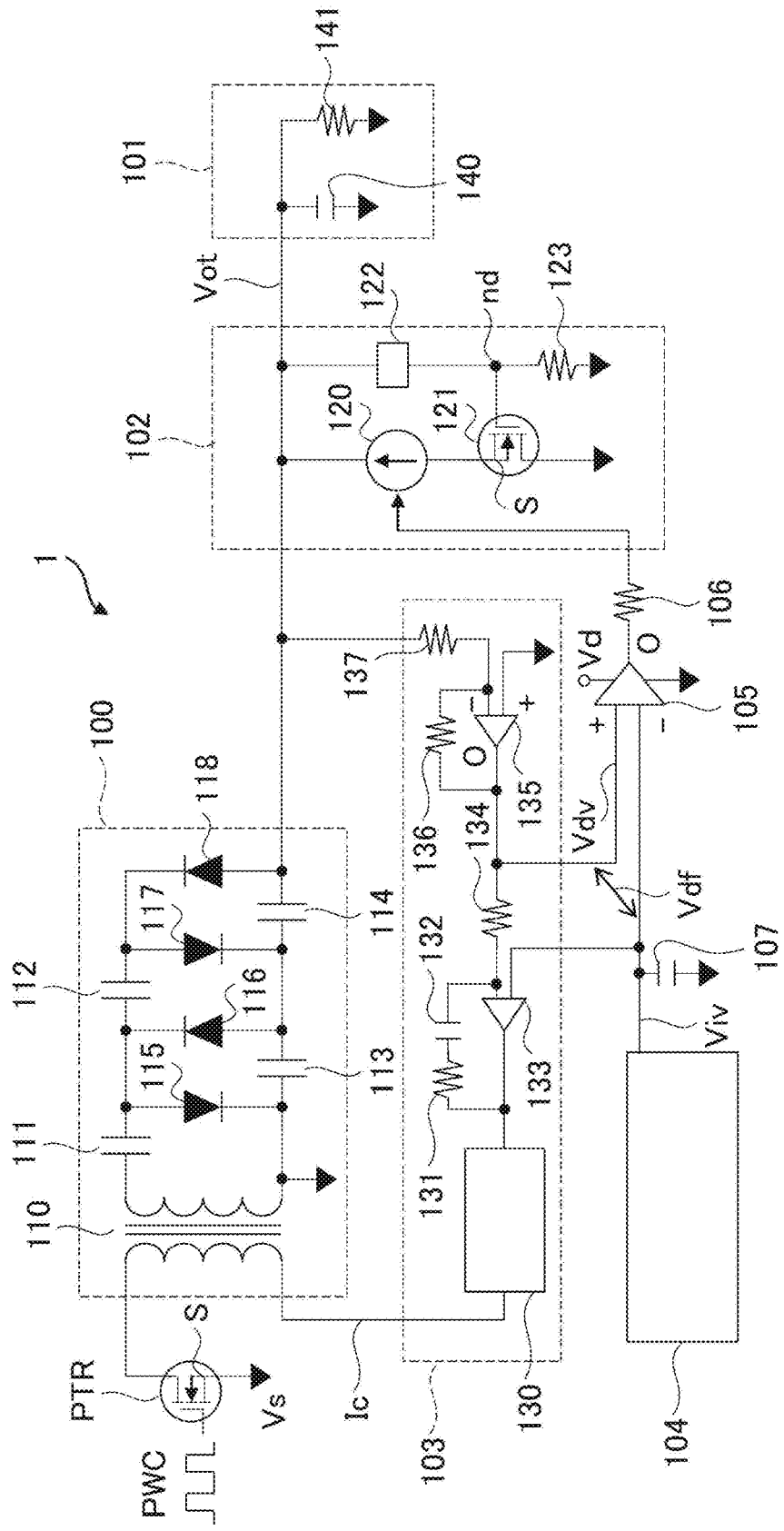

HIGH-VOLTAGE CONTROL CIRCUIT

TECHNICAL FIELD

The present invention relates to a high-voltage control circuit, for example, a high-voltage control circuit capable of voltage boosting and voltage bucking.

BACKGROUND ART

As a high-voltage control circuit, for example, a high-voltage control circuit using a high-voltage rectifier circuit represented by, for example, a Cockcroft-Walton circuit (hereinafter also referred to as a CW circuit) is known. In this case, in the high-voltage rectifier circuit, a diode element performs diode rectification on an AC voltage. By a current obtained by the diode rectification, electric charges are accumulated in a smoothing capacitor and are used as a DC voltage to be supplied to a load. In order to set the DC voltage to a large voltage value, the DC voltage is boosted in the CW circuit and can be boosted in a short time.

On the other hand, there is a problem that it takes a long time to change the DC voltage from a large voltage value to a small voltage value during voltage bucking. That is, during the voltage bucking, the electric charges accumulated in the smoothing capacitor are discharged via a high-resistance path such as a feedback circuit for controlling the DC voltage to a desired value, whereby it takes a long time for discharge and voltage bucking.

During the voltage bucking, a time until the DC voltage is settled to a desired small voltage value is a waiting time when a device using the high-voltage control circuit is operated. Therefore, in an application in which the voltage value of the DC voltage as an output of the high-voltage control circuit is frequently increased or decreased, the waiting time may be long.

For example, PTL 1 and PTL 2 disclose a technique of generating a discharging path and discharging at a high speed during the voltage bucking.

CITATION LIST

Patent Literature

PTL 1: JP2001-230098A
PTL 1: JP2019-204751A

SUMMARY OF INVENTION

Technical Problem

FIG. 1 in PTL 1 shows that a switch circuit (200, 300), in which semiconductor switches (21 to 2n, 31 to 3n) are connected in multiple stages, is provided in parallel with a smoothing capacitor (161, 162), and the switch circuit is made conductive during the voltage bucking, thereby speeding up the voltage bucking. Regarding control of the switch circuit, a discharge timing is supplied by an external signal, and it is necessary to supply the external signal having a length according to an appropriate timing and a discharge amount.

FIG. 5 in PTL 2 shows that a discharge circuit including resistors (R1, R2) and photocouplers (U1, U2) is provided at both ends of a low-voltage side capacitor (C2, C4) in a CW circuit, and a discharge amount is controlled by controlling an on/off ratio of the discharge circuit using a pulse signal. In this case, in order to generate pulse signals for a plurality of discharge circuits based on a necessary discharge amount, it is necessary to perform calculation processing using a processor or the like.

That is, in the techniques disclosed in PTL 1 and PTL 2, discharge control is performed by processing using an external signal, a processor, or the like. Therefore, when a load of a high-voltage control circuit changes, it is necessary to change a setting of the external signal or the processor, and a configuration or a control algorithm of the processor may be complicated.

An object of the invention is to provide a high-voltage control circuit capable of shortening a time required for voltage bucking with a simple configuration without requiring a complicated control algorithm.

Other objects and novel features of the invention will be apparent based on the description of the present specification and the accompanying drawings.

Solution to Problem

An outline of a representative embodiment among embodiments disclosed in the present application will be briefly described as follows.

That is, a high-voltage control circuit according to the embodiment includes: a high-voltage rectifier circuit configured to convert an AC voltage into a DC high voltage; a smoothing capacitor configured to smooth the DC high voltage output from the high-voltage rectifier circuit; a switch circuit connected in parallel to the smoothing capacitor; a feedback circuit including a first amplifier configured to amplify a differential voltage between a command voltage and a voltage value following the DC high voltage, and configured to control the high-voltage rectifier circuit based on an output signal of the first amplifier; and a second amplifier configured to amplify the differential voltage. Here, conduction of the switch circuit is controlled by an output signal of the second amplifier.

Advantageous Effects of Invention

To briefly describe effects obtained by the representative embodiment according to the invention disclosed in the present application, it is possible to provide a high-voltage control circuit capable of shortening a time required for voltage bucking with a simple configuration without requiring a complicated control algorithm.

BRIEF DESCRIPTION OF DRAWINGS

FIG. 1 is a block diagram showing a configuration of a high-voltage control circuit according to Embodiment 1.

DESCRIPTION OF EMBODIMENTS

Figure 2A:
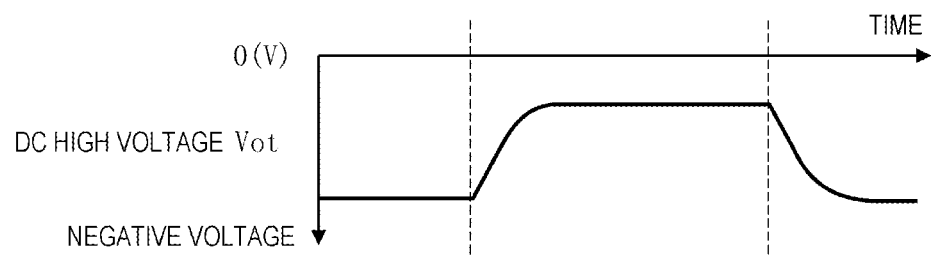
FIGS. 2A to 2C are waveform diagrams showing operations of the high-voltage control circuit according to Embodiment 1.

Embodiments will be described with reference to the drawings. The embodiments described below do not limit the invention according to the claims, and all of the elements and combinations thereof described in the embodiments are not necessarily essential to the solution of the invention.

Embodiment 1

FIG. 1 is a block diagram showing a configuration of a high-voltage control circuit according to Embodiment 1. Hereinafter, a high-voltage control circuit 1, which is a specific example according to Embodiment 1 shown in FIG. 1, will be described. In Embodiment 1, an example will be described in which the high-voltage control circuit 1 outputs a DC high voltage Vot having a negative polarity (negative voltage) with respect to a ground voltage (hereinafter also referred to as a predetermined reference voltage) Vs. An example will be described in which an operational amplifier is used as an amplifier constituting the high-voltage control circuit 1.

<Configuration of High-Voltage Control Circuit>

The high-voltage control circuit 1 includes a high-voltage rectifier circuit 100, a smoothing capacitor 140 that smoothes the DC high voltage Vot output from the high-voltage rectifier circuit 100, a control circuit 104 that outputs a command voltage Viv that determines a voltage value of the DC high voltage Vot, and a feedback circuit 103 that is supplied with the command voltage Viv and the DC high voltage Vot and feeds back a current signal Ic to the high-voltage rectifier circuit 100. In FIG. 1, a reference numeral 101 denotes a load to be supplied with the DC high voltage Vot output from the high-voltage rectifier circuit 100. The load 101 has a configuration in which the smoothing capacitor 140 and a resistance element 141 equivalently representing an actual load are connected in parallel.

In addition, the high-voltage control circuit 1 according to Embodiment 1 includes a switch circuit 102 connected in parallel to the smoothing capacitor 140, and an amplifier 105 that amplifies a differential voltage Vdf corresponding to a difference between a divided voltage Vdv, which changes according to the DC high voltage Vot, and the command voltage Viv and controls conduction of the switch circuit 102. In FIG. 1, an output signal of the amplifier 105 is supplied to the switch circuit 102 via a current limiting resistance element 106.

In FIG. 1, a reference numeral PTR denotes an N-channel field effect transistor (hereinafter referred to as a transistor), and a reference numeral 107 denotes a capacitor for stabilizing the command voltage Viv.

The transistor PTR includes a gate supplied with a periodically changed pulse signal PWC, a source S, and a drain. The source S of the transistor PTR is connected to a ground voltage Vs, and the drain is connected to the high-voltage rectifier circuit 100.

In FIG. 1, in order to avoid making the drawing complicated, the reference numeral Vs indicating a ground voltage is given only to the ground voltage connected to the source S of the transistor PTR, and other ground voltages are only represented by black downward arrows. In the following drawings, a method of clearly indicating a ground voltage is the same as in FIG. 1.

The high-voltage rectifier circuit 100 is implemented by a CW circuit including a transformer 110, diodes 115 to 118, and capacitors 111 to 114. A primary coil of the transformer 110 includes a terminal connected to the drain of the transistor PTR and a terminal supplied with the current signal Ic from the feedback circuit 103. When the transistor PTR is periodically turned on or turned off by the pulse signal PWC, the current signal Ic periodically flows through the primary coil, and an AC voltage is generated in a secondary coil of the transformer 110. The AC voltage generated in the secondary coil of the transformer 110 is converted into the negative DC high voltage Vot by the diodes 115 to 118 and the capacitors 111 to 114.

The DC high voltage Vot is supplied to the smoothing capacitor 140, the smoothing capacitor 140 is charged by the DC high voltage Vot, and the DC high voltage Vot is smoothed by accumulating electric charges.

The control circuit 104 includes, for example, a digital/analog conversion circuit (hereinafter referred to as a D/A converter), and outputs the analog command voltage Viv corresponding to a digital command signal input to the D/A converter. The control circuit 104 shown in FIG. 1 outputs the command voltage Viv having a positive polarity (positive voltage) with respect to the ground voltage Vs. Since the control circuit 104 outputs the command voltage Viv, the control circuit 104 can also be regarded as a command voltage output circuit.

The feedback circuit 103 includes an inverting amplifier 135, an error amplifier (hereinafter also referred to as a first amplifier) 133, a current amplifier 130, resistance elements 131, 134, 136, and 137, and a capacitor 132.

The DC high voltage Vot is supplied to a negative input terminal (−) of the inverting amplifier 135 via the resistance element 137. The ground voltage Vs is supplied to a positive input terminal (+) of the inverting amplifier 135. The resistance element 136 is connected between the negative input terminal (−) of the inverting amplifier 135 and an output terminal (O) of the inverting amplifier 135. A change in the voltage value of the DC high voltage Vot is inverted by the inverting amplifier 135, and the DC high voltage Vot is divided according to a resistance ratio between the resistance element 137 and the resistance element 136. That is, from the output terminal O of the inverting amplifier 135, a voltage obtained by inverting the change in the DC high voltage Vot and divided by a voltage divider including the resistance element 137 and the resistance element 136 is output. In other words, the inverting amplifier 135 has a function of a voltage divider and outputs the voltage according to the DC high voltage Vot.

The output voltage of the inverting amplifier 135 is supplied to one input terminal of the error amplifier 133 via the resistance element 134, and is output from the feedback circuit 103 as the divided voltage Vdv. The resistance element 131 and the capacitor 132 that constitute a filter are connected in series between the one input terminal of the error amplifier 133 and an output terminal of the error amplifier 133. The command voltage Viv from the control circuit 104 is supplied to the other input terminal of the error amplifier 133. The error amplifier 133 amplifies the differential voltage Vdf, which is a voltage difference between the voltage (divided voltage Vdv) supplied to the one input terminal and the command voltage Viv supplied to the other input terminal, and supplies the amplified differential voltage Vdf to the current amplifier 130.

The current amplifier 130 outputs the current signal Ic having a value smaller than that of the differential voltage Vdf to the high-voltage rectifier circuit 100.

The amplifier 105 is an amplifier that operates with a single power supply voltage. That is, the amplifier 105 operates using the ground voltage Vs and a predetermined positive voltage Vd as the power supply voltage. In FIG. 1, the command voltage Viv is supplied to a negative input terminal (−) of the amplifier 105, and the divided voltage Vdv is supplied to a positive input terminal (+). Therefore, when a voltage value of the divided voltage Vdv is larger than that of the command voltage Viv, the amplifier 105 amplifies the differential voltage Vdf as the voltage difference, and outputs the amplified differential voltage Vdf as a voltage having a positive polarity with respect to the ground voltage Vs. As shown in FIG. 1, since the divided voltage Vdv is output from the inverting amplifier 135, when the voltage value of the DC high voltage Vot changes to, for example, a negative voltage side, the voltage value of the divided voltage Vdv changes to a positive voltage side.

The switch circuit 102 includes a fixed voltage element 122 and a resistance element 123 that are connected in series between the DC high voltage Vot and the ground voltage Vs. A predetermined voltage value is output from a connection node no between the fixed voltage element 122 and the resistance element 123. Regarding the fixed voltage element 122, there is no particular limitation and a constant voltage diode is used, and the predetermined voltage value output from the connection node no is a voltage value determined by the fixed voltage element 122 and the resistance element 123.

The switch circuit 102 further includes a current limiter 120 and an N-channel transistor 121. The current limiter 120 is a limiter that determines the amount of a current flowing therethrough according to the output signal from the amplifier 105 supplied via the current limiting resistance element 106. That is, the amount of the current flowing through the current limiter 120 is determined by the output signal of the amplifier 105. The current limiter 120 is connected between the DC high voltage Vot and a source S of the transistor 121, and a drain of the transistor 121 is connected to the ground voltage Vs. That is, the current limiter 120 and a path between the source S and the drain of the transistor 121 are connected in series between the DC high voltage Vot and the ground voltage Vs.

A gate of the transistor 121 is connected to the connection node no. A predetermined voltage at the connection node no is set to a voltage at which the transistor 121 is conductive. Therefore, when flowing through the current limiter 120, the current flows between the DC high voltage Vot and the ground voltage Vs via the current limiter 120 and the transistor 121. In the present specification, a time when the current flows through the current limiter 120 and the transistor 121 is referred to as a time when the switch circuit 102 is conductive.

In the high-voltage control circuit 1, when the DC high voltage Vot is bucked, the switch circuit 102 connected in parallel to the smoothing capacitor 140 is made conductive, and the smoothing capacitor 140 is discharged. More specifically, during the voltage bucking, the current limiter 120 and the transistor 121 connected in series form a discharge current path for discharging the electric charges stored in the smoothing capacitor 140.

In FIG. 1, the amount of the current flowing through the current limiter 120 is determined according to the amount of a current of the output signal from the amplifier 105. Therefore, the amount of the current when the smoothing capacitor 140 is discharged can be adjusted by a resistance value of the current limiting resistance element 106 connected between an output terminal O of the amplifier 105 and the current limiter 120. For example, when the resistance value of the current limiting resistance element 106 is increased, the amount of the current supplied from the amplifier 105 to the current limiter 120 can be decreased, and the amount of the current during discharge can be decreased. In contrast, when the resistance value of the current limiting resistance element 106 is decreased, the amount of the current supplied from the amplifier 105 to the current limiter 120 can be increased, and the amount of the current during discharge can be increased. Therefore, by adjusting the resistance value of the current limiting resistance element 106, it is possible to adjust a waiting time required for the voltage bucking. Of course, if it is unnecessary to adjust the amount of the current, the current limiting resistance element 106 may not be provided.

Figure 2B:
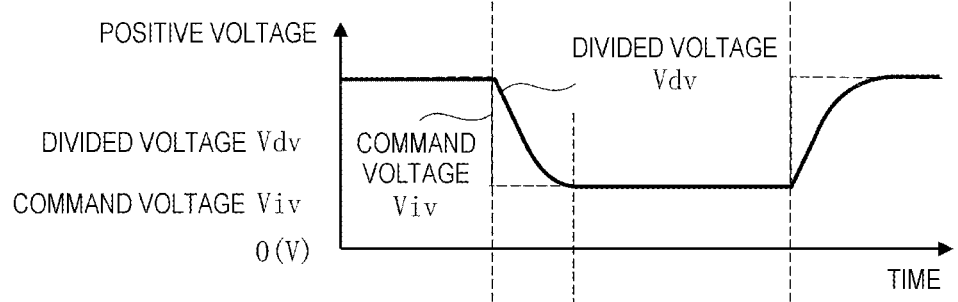
Figure 2C:
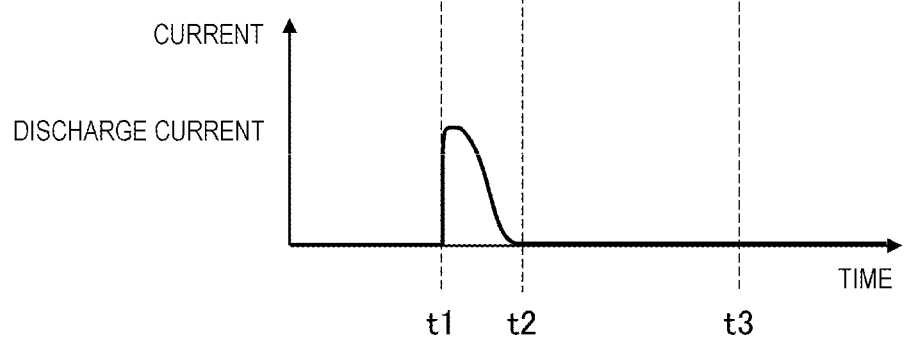

As will be described in detail later with reference to FIGS. 2A to 2C, when the DC high voltage Vot is bucked, the control circuit 104 outputs a voltage value to be bucked as the command voltage Viv. At this time, the DC high voltage Vot is a boosted high voltage having a negative polarity, the voltage value of the divided voltage Vdv is larger than that of the command voltage Viv, and thus the amplifier 105 amplifies the differential voltage Vdf and outputs the amplified differential voltage Vdf. As a result, the switch circuit 102 is conductive, the smoothing capacitor 140 is discharged, and the DC high voltage Vot is bucked in a short time.

In contrast, when the DC high voltage Vot is boosted, based on an operation of the feedback circuit 103, the divided voltage Vdv changes toward a direction in which the divided voltage Vdv coincides with the command voltage Viv to coincide with the command voltage Viv. That is, the voltage value of the command voltage Viv is larger than or equal to that of the divided voltage Vdv. Since the command voltage Viv is supplied to the negative input terminal (−) of the amplifier 105, the amplifier 105 outputs, for example, an output signal of the ground voltage Vs. As a result, no current flows through the current limiter 120. That is, since the switch circuit 102 is in a cut-off (non-conductive) state, the switch circuit 102 is not affected during the voltage boosting.

<Operation Example of High-voltage Control Circuit>

Next, operations of the high-voltage control circuit 1 shown in FIG. 1 will be described with reference to the drawings. FIGS. 2A to 2C is a waveform diagram showing operations of the high-voltage control circuit according to Embodiment 1. Here, FIG. 2A shows a waveform of the DC high voltage Vot, FIG. 2B shows waveforms of the divided voltage Vdv and the command voltage Viv, and FIG. 2C shows a waveform of a current (discharge current) flowing through the switch circuit 102. In FIG. 2A, a direction indicated by an arrow of a vertical axis indicates a direction in which an absolute value of a negative voltage increases. In FIG. 2B, a direction indicated by an arrow of a vertical axis indicates a direction in which an absolute value of a positive voltage increases. In FIGS. 2A to 2C, a horizontal axis indicates time, and FIGS. 2A to 2C represent time-series changes in the waveforms.

Until a time t1, the divided voltage Vdv of the DC high voltage Vot coincides with the command voltage Viv. That is, the DC high voltage Vot corresponding to the command voltage Viv is stably output.

An instruction to buck the DC high voltage Vot is issued at the time t1. According to the instruction for the voltage bucking, the control circuit 104 outputs a desired voltage value to be bucked at the time t1 as that of the command voltage Viv. Due to the voltage bucking, the divided voltage Vdv of the DC high voltage Vot is higher than the command voltage Viv, and in FIGS. 2A to 2C, the divided voltage Vdv continues to be higher than the command voltage Viv during a period from the time t1 to a time t2. In this period, the amplifier 105 amplifies the differential voltage Vdf and outputs the amplified differential voltage Vdf. As a result, the switch circuit 102 is in a conductive state, the discharge current as shown in FIG. 2C flows through the switch circuit 102, the smoothing capacitor 140 is discharged, and the DC high voltage Vot decreases toward the ground voltage Vs.

When the DC high voltage Vot decreases and the divided voltage Vdv is equal to the command voltage Viv at the time t2, the output signal of the amplifier 105 is a voltage value corresponding to that of the ground voltage Vs. As a result, the switch circuit 102 is cut off. Since the switch circuit 102 is cut off, the smoothing capacitor 140 stops being discharged, and the discharge current disappears as shown in FIG. 2C.

The command voltage Viv is not changed from the time t2 to a time t3, which also applies to the period from the time t2 to the time t1. However, in the period from the time t2 to the time t3, the bucked DC high voltage Vot is output.

At the time t3, in order to increase the DC high voltage Vot (to a higher negative voltage), the control circuit 104 increases the command voltage Viv. Due to the increase, the voltage value of the command voltage Viv is larger than that of the divided voltage Vdv of the DC high voltage Vot. In this state, since a voltage value of the negative input terminal (−) of the amplifier 105 is larger than that of the positive input terminal (+), the amplifier 105 outputs an output signal corresponding to the ground voltage Vs. As a result, the switch circuit 102 is in the cut-off state, and no discharge current flows as shown in FIG. 2C. Meanwhile, the smoothing capacitor 140 is charged by a current supplied from the high-voltage rectifier circuit 100. Therefore, when the DC high voltage Vot is increased and the divided voltage Vdv of the DC high voltage Vot coincides with the command voltage Viv, the DC high voltage Vot stops increasing and is stabilized at a constant voltage value.

According to the high-voltage control circuit 1 of Embodiment 1, by only changing the command voltage Viv, it is possible to bring the switch circuit 102 into the conductive state only when the voltage bucking is necessary and to discharge the smoothing capacitor 140 in a short time. That is, according to Embodiment 1, it is possible to provide a high-voltage control circuit capable of shortening a time required for the voltage bucking with a simple configuration without requiring a complicated control algorithm.

According to Embodiment 1, the amplifier constituting the high-voltage control circuit can operate with a single power supply voltage, and a plurality of power supply voltages may not be prepared for the amplifier.

Embodiment 2

Figure 3:
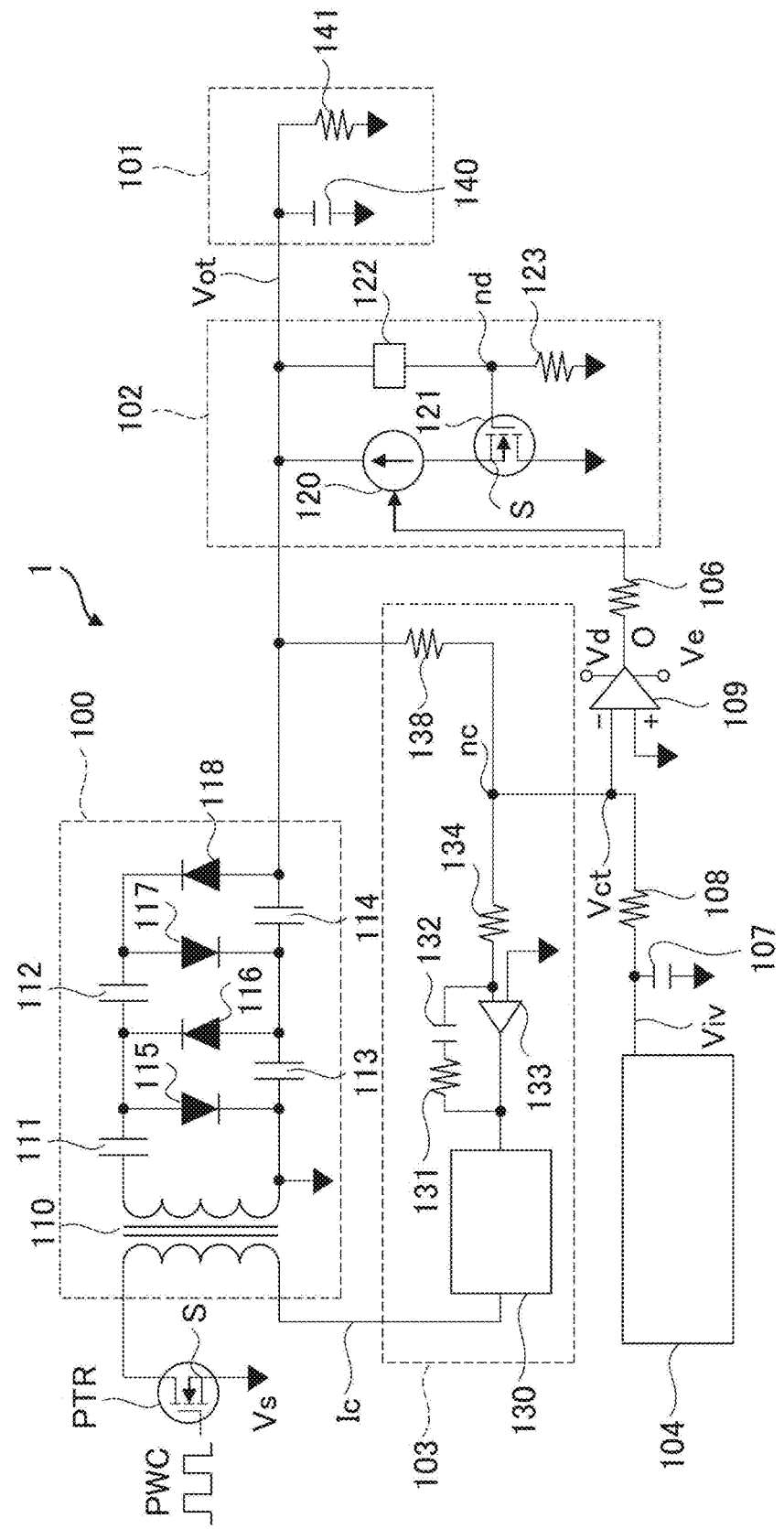
FIG. 3 is a block diagram showing a configuration of a high-voltage control circuit according to Embodiment 2.

FIG. 3 is a block diagram showing a configuration of a high-voltage control circuit according to Embodiment 2. Since FIG. 3 is similar to FIG. 1, differences will be mainly described.

<Configuration of High-Voltage Control Circuit>

A main difference in FIG. 3 is that, a portion related to the inverting amplifier 135 shown in FIG. 1, a portion related to the amplifier 105 shown in FIG. 1, and a portion related to the error amplifier 133 shown in FIG. 1 are changed.

In the high-voltage control circuit of FIG. 1, the inverting amplifier 135 is used to divide the DC high voltage Vot and invert the change in the voltage. In FIG. 1, in order to amplify the differential voltage Vdf between the divided voltage Vdv and the command voltage Viv, the amplifier 105 that operates with a single power supply voltage is used. Further, in FIG. 1, the divided voltage Vdv and the command voltage Viv are supplied to the error amplifier 133.

In contrast, in FIG. 3, the portion related to the inverting amplifier 135, that is, the inverting amplifier 135 and the resistance elements 136 and 137 are changed to a resistance element 138. The portion related to the amplifier 105 is changed to an amplifier 109 that operates with a plurality of power supply voltages and a resistance element 108. Further, in the error amplifier 133, the ground voltage Vs is supplied instead of the command voltage Viv.

The resistance element 138 is connected between an output of the high-voltage rectifier circuit 100 and a synthesis node nc. The synthesis node nc is connected to an input of the error amplifier 133 via the resistance element 134. Further, the synthesis node nc is connected to the control circuit 104 via the resistance element 108 and is connected to a negative input terminal (−) of the amplifier 109. A positive input terminal (+) of the amplifier 109 is connected to the ground voltage Vs, and an output terminal O of the amplifier 109 is connected to the switch circuit 102 via the current limiting resistance element 106.

As described above, the DC high voltage Vot is a negative voltage, and the command voltage Viv is a positive voltage. In Embodiment 2, when a voltage value of the DC high voltage Vot coincides with a desired voltage value instructed by the command voltage Viv, resistance values of the resistance elements 108 and 138 are set such that a midpoint voltage Vct at the synthesis node nc is the ground voltage Vs, that is, 0 (V). That is, when the DC high voltage Vot and the command voltage Viv are synthesized via the resistance elements and the DC high voltage Vot and the command voltage Viv are balanced, the resistance values of the resistance elements 108 and 138 are set such that the midpoint voltage Vct is a predetermined voltage (ground voltage Vs).

Therefore, when the voltage value of the DC high voltage Vot deviates from the voltage value instructed by the command voltage Viv, the midpoint voltage Vct deviates from the ground voltage Vs and is a positive voltage or a negative voltage. In other words, the midpoint voltage Vct substantially corresponds to the differential voltage Vdf (FIG. 1) as a difference between the DC high voltage Vot and the command voltage Viv.

In FIG. 3, the amplifier 109 amplifies a differential voltage between the midpoint voltage Vct and the ground voltage Vs, and the current limiter 120 is controlled by an output signal of the amplifier 109. The amplifier 109 is an amplifier that operates using a predetermined positive voltage Vd and a predetermined negative voltage Ve as the power supply voltages. Since the amplifier 109 operates using the positive voltage Vd and the negative voltage Ve as the power supply voltages, when a voltage value of the midpoint voltage Vct supplied to the negative input terminal (−) is larger than that of the ground voltage Vs, the amplifier 109 outputs an output signal having a negative polarity with respect to the ground voltage Vs as a reference voltage, and when the midpoint voltage Vct is lower than the ground voltage Vs, the amplifier 109 outputs an output signal having a positive polarity with respect to the ground voltage Vs as the reference voltage. Although FIG. 3 shows an example in which two power supply voltages are used as the amplifier 109, the amplifier 109 may operate with the plurality of power supply voltages using three or more power supply voltages.

When the output signal of the amplifier 109 supplied via the current limiting resistance element 106 has a positive polarity, the current limiter 120 operates such that a current according to the output signal flows between the DC high voltage Vot and the source S of the transistor 121. That is, the switch circuit 102 is in a conductive state. On the other hand, when the output signal of the amplifier 109 is the ground voltage Vs or has a negative polarity, the current limiter 120 operates without current flowing therethrough. That is, the switch circuit 102 is in a cut-off state.

An operation example will be described later with reference to FIGS. 4A to 4D, in which the midpoint voltage Vct is a voltage having a negative polarity during the voltage bucking, and the output signal of the amplifier 109 has a positive polarity. As a result, the switch circuit 102 is in the conductive state, and the smoothing capacitor 140 is discharged in a short time. In a period other than the time of the voltage bucking, the output signal of the amplifier 109 is the ground voltage Vs or has a negative polarity. As a result, the switch circuit 102 is in the cut-off state, and the switch circuit 102 can be prevented from affecting the high-voltage control circuit 1.

In the feedback circuit 103, the error amplifier 133 amplifies the differential voltage between the ground voltage Vs and the midpoint voltage Vct supplied via the resistance element 134. The feedback circuit 103 outputs the current signal Ic that decreases the differential voltage to the high-voltage rectifier circuit 100.

<Operation Example of High-voltage Control Circuit>

Figure 4A:
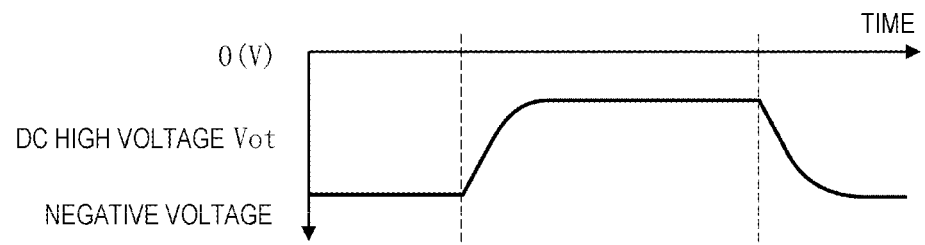
FIGS. 4A to 4D are waveform diagrams showing operations of the high-voltage control circuit according to Embodiment 2.
Figure 4B:
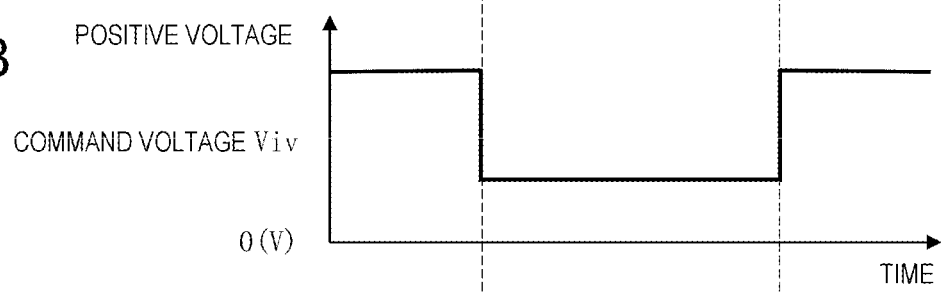
Figure 4C:
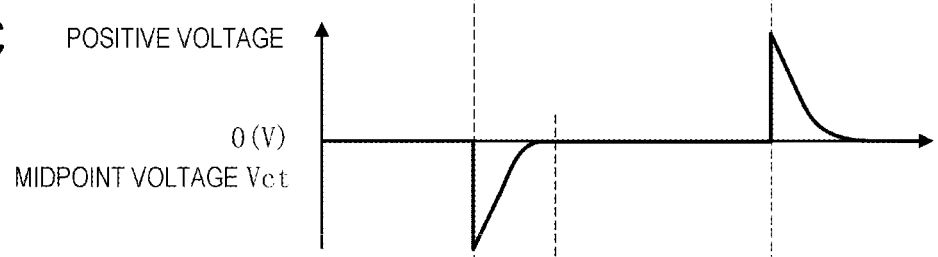
Figure 4D:
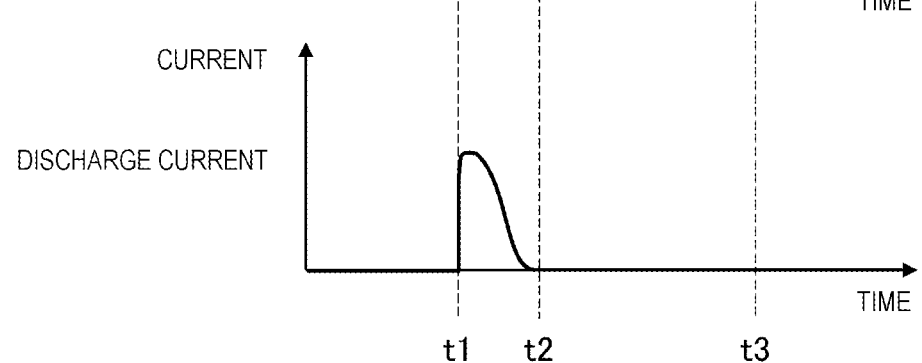

FIGS. 4A to 4D are waveform diagrams showing operations of the high-voltage control circuit according to Embodiment 2. Here, FIG. 4A shows a waveform of the DC high voltage Vot, FIG. 4B shows a waveform of the command voltage Viv, FIG. 4C shows a waveform of the midpoint voltage Vct, and FIG. 4D shows a waveform of a current (discharge current) flowing through the switch circuit 102. In FIG. 4A, a direction indicated by an arrow of a vertical axis indicates a direction in which an absolute value of a negative voltage increases. In FIGS. 4B and 4C, a direction indicated by an arrow of a vertical axis indicates a direction in which an absolute value of a positive voltage increases. In FIGS. 4A to 4D, a horizontal axis indicates time, and FIGS. 4A to 4D represent time-series changes in the waveforms.

Until the time t1, the DC high voltage Vot coincides with the voltage instructed by the command voltage Viv, and has a stable voltage value. Since the DC high voltage Vot coincides with the voltage instructed by the command voltage Viv, the midpoint voltage Vct formed by synthesizing the command voltage and the DC high voltage Vot is the ground voltage (0 (V)). As a result, the amplifier 109 (FIG. 3) outputs an output signal of the ground voltage, and the switch circuit 102 (FIG. 3) is in the cut-off state.

At the time t1, with an instruction of the voltage bucking, the control circuit 104 (FIG. 3) decreases the command voltage Viv. Since a voltage value of the command voltage Viv supplied to the synthesis node nc via the resistance element 108 (FIG. 3) is smaller than an absolute value of the DC high voltage Vot supplied to the synthesis node nc (FIG. 3) via the resistance element 138 (FIG. 3), the midpoint voltage Vct is lower than the ground voltage as shown in FIG. 4C. As a result, the amplifier 109 (FIG. 3) outputs an output signal of a positive voltage. With the output signal, the switch circuit 102 is in the conductive state, and electric charges accumulated in the smoothing capacitor 140 (FIG. 3) are discharged by the discharge current (FIG. 4D) flowing through the switch circuit 102.

When the smoothing capacitor 140 proceeds with the discharging, and the absolute value of the DC high voltage Vot decreases and coincides with the voltage value of the command voltage Viv at the time t2, the midpoint voltage Vct returns to the ground voltage. Since the midpoint voltage Vct is the ground voltage, the switch circuit 102 is in the cut-off state again, and the discharge current disappears as shown in FIG. 4D.

Next, a case where the voltage boosting is instructed at the time t3 and the control circuit 104 increases the command voltage Viv will be described. In this case, since the voltage value of the command voltage Viv supplied to the synthesis node nc via the resistance element 108 is larger than the absolute value of the DC high voltage Vot supplied to the synthesis node nc via the resistance element 138, the midpoint voltage Vct increases from the ground voltage as shown in FIG. 4C. In this case, the amplifier 109 outputs a signal having a negative polarity, and the switch circuit 102 maintains the cut-off state. As a result, as shown in FIG. 4D, no discharge current flows in the switch circuit 102, and the smoothing capacitor 140 is not discharged.

Meanwhile, at the time t3, the error amplifier 133 (FIG. 3) amplifies the differential voltage between the midpoint voltage Vct and the ground voltage and supplies the amplified differential voltage to the current amplifier 130. The current amplifier 130 outputs the current signal Ic that decreases the differential voltage to the high-voltage rectifier circuit 100. As a result, the smoothing capacitor 140 is charged by the output of the high-voltage rectifier circuit 100, and the DC high voltage Vot increases. That is, the absolute value of the DC high voltage Vot as a negative voltage increases.

Also in Embodiment 2, similarly to Embodiment 1, it is possible to provide a high-voltage control circuit capable of shortening a time required for the voltage bucking with a simple configuration without requiring a complicated control algorithm. Further, according to Embodiment 2, since the inverting amplifier as shown in FIG. 1 is unnecessary, the high-voltage control circuit 1 can be further simplified in configuration.

Embodiment 3

Figure 5:
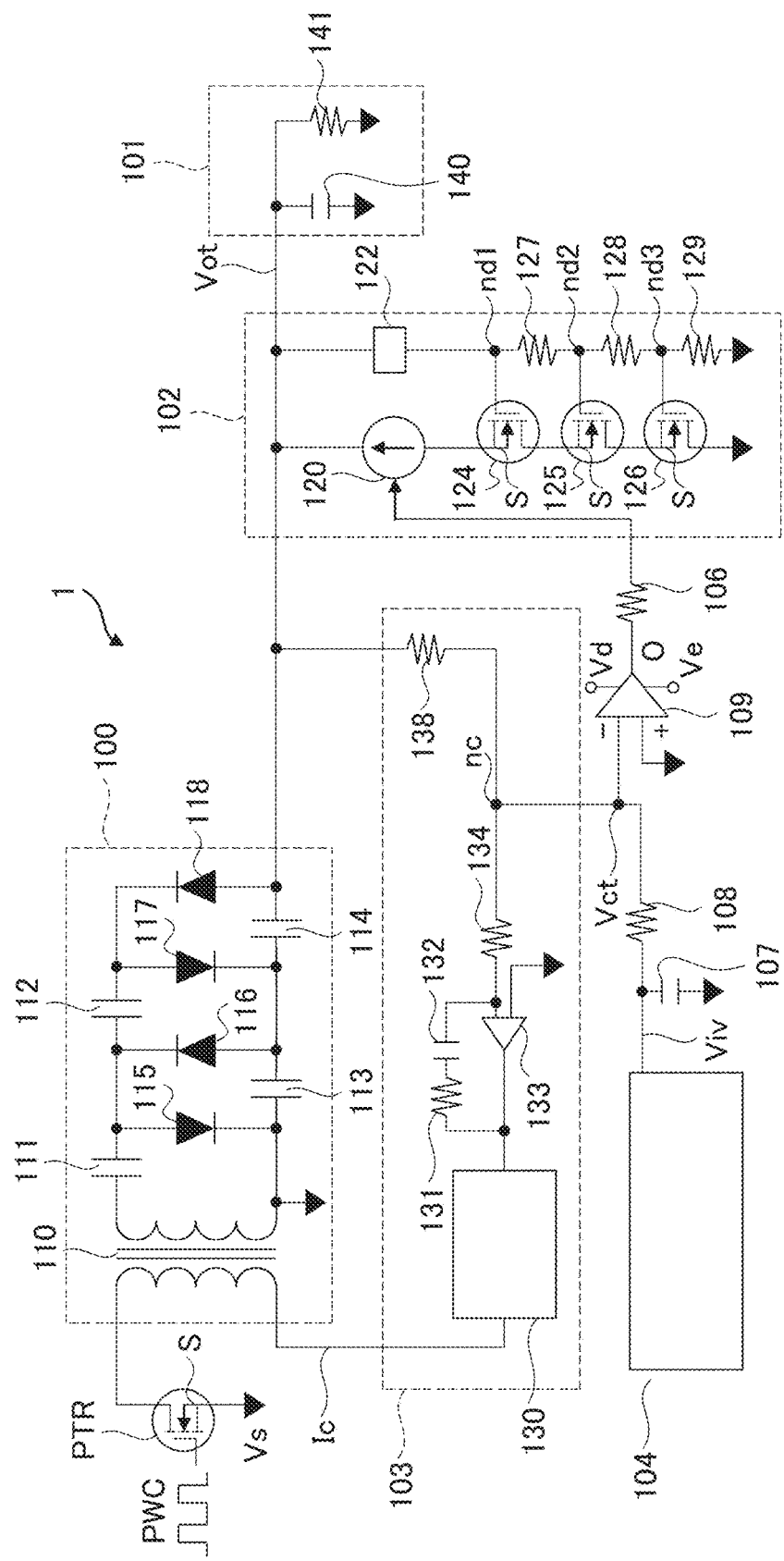
FIG. 5 is a block diagram showing a configuration of a high-voltage control circuit according to Embodiment 3.

FIG. 5 is a block diagram showing a configuration of a high-voltage control circuit according to Embodiment 3. Since FIG. 5 is similar to FIG. 3, differences will be mainly described.

A main difference in FIG. 5 is that, a configuration of the switch circuit 102 is changed from that of the switch circuit 102 shown in FIG. 3. That is, in FIG. 3, one transistor 121 is connected between the current limiter 120 and the ground voltage Vs, and one resistance element 123 is connected between the fixed voltage element 122 and the ground voltage Vs. In contrast, in FIG. 5, three transistors 124 to 126 are connected in series between the current limiter 120 and the ground voltage Vs, and three resistance elements 127 to 129 are connected in series between the fixed voltage element 122 and the ground voltage Vs.

More specifically, paths between sources and drains of the three transistors 124 to 126 are connected in series between the current limiter 120 and the ground voltage Vs. A gate of the transistor 124 is connected to a node nd1 connecting the resistance element 127 and the fixed voltage element 122, a gate of the transistor 125 is connected to a node nd2 connecting the resistance element 127 and the resistance element 128, and a gate of the transistor 126 is connected to a node nd3 connecting the resistance element 128 and the resistance element 129. Resistance values of the resistance elements 127 to 129 are set such that voltages for turning on the respective transistors are supplied to the gates of the transistors 124 to 126.

By connecting the transistors 124 to 126 in multiple stages, it is possible to reduce the voltage borne by one transistor when electric charges of the smoothing capacitor 140 are discharged. As a result, a higher DC high voltage Vot can be discharged. For example, when a breakdown voltage of one transistor is 2 kV, a total breakdown voltage can be 6 kV by connecting three transistors in series in multiple stages as shown in FIG. 5. Of course, the number of stages of transistors is not limited to three, and may be two or four or more.

Embodiment 4

Figure 6:
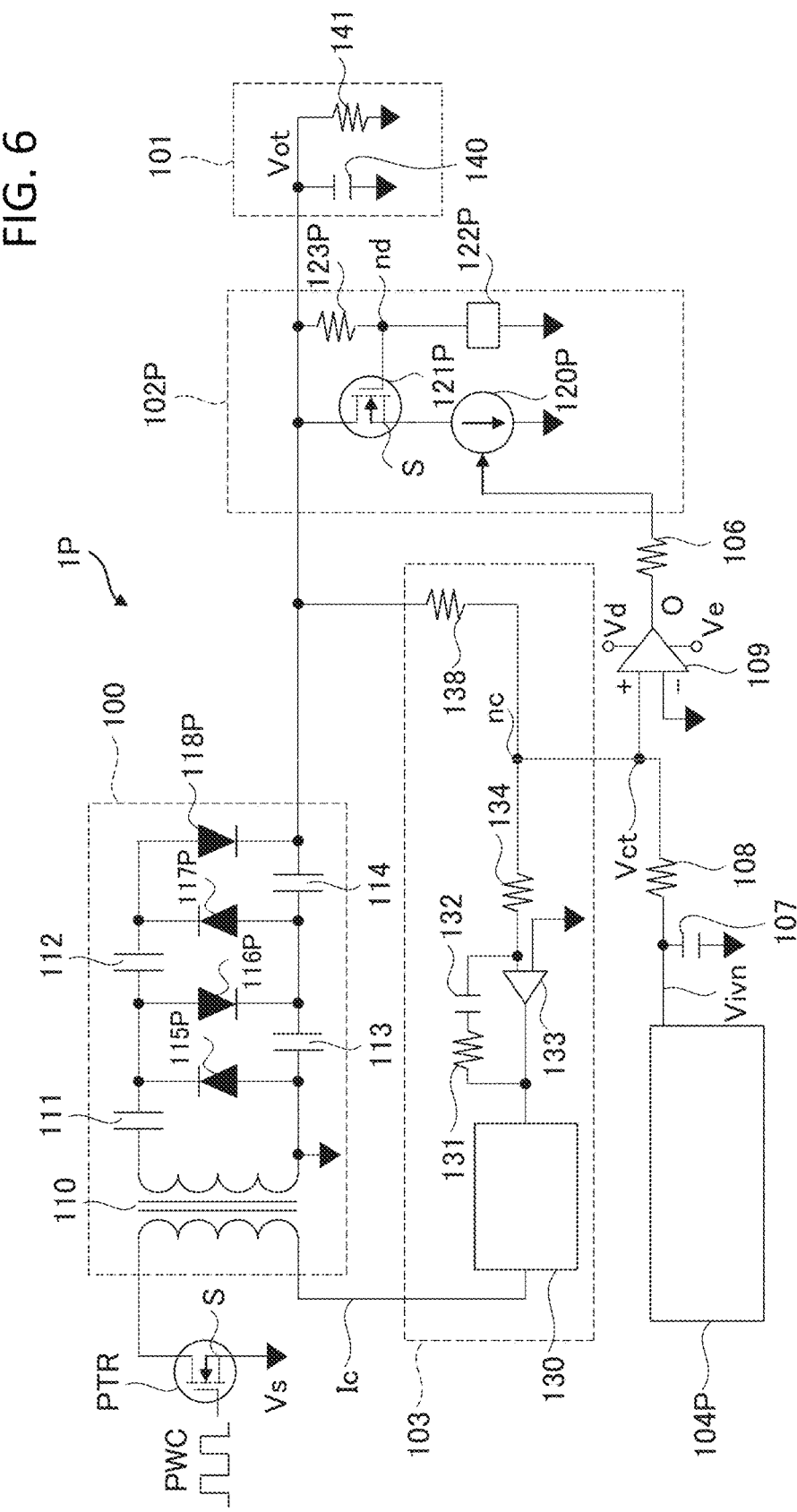
FIG. 6 is a block diagram showing a configuration of a high-voltage control circuit according to Embodiment 4.

FIG. 6 is a block diagram showing a configuration of a high-voltage control circuit according to Embodiment 4. Since FIG. 6 is similar to FIG. 3, differences will be mainly described.

A main difference in FIG. 6 is that, a high-voltage control circuit 1P is configured to output a high voltage having a positive polarity instead of outputting a high voltage having a negative polarity by boosting.

Referring to FIG. 6, specifically describing the differences, in a high-voltage rectifier circuit 100P corresponding to the high-voltage rectifier circuit 100 of FIG. 3, a connection direction of diodes is changed, and the diodes 115 to 118 are changed to diodes 115P to 118P. A control circuit 104P corresponding to the control circuit 104 of FIG. 3 outputs a command voltage Vivn that changes toward a direction having a negative polarity according to an instruction.

Further, in the switch circuit 102P corresponding to the switch circuit 102 of FIG. 3, the arrangement of a transistor and a current limiting element is replaced with that of a transistor 121P and a current limiter 120P with respect to FIG. 3. With respect to FIG. 3, the arrangement of a resistance element and a fixed voltage element is replaced with that of a resistance element 123P and a fixed voltage element 122P. As shown in FIG. 6, a source S of the transistor 121P is connected to the current limiter 120P similarly to that in FIG. 3, but in the current limiter 120P, a direction in which a current flows is opposite to that in FIG. 3. The midpoint voltage Vct is supplied to a positive input terminal (+) of the amplifier 109, and the ground voltage Vs is supplied to a negative input terminal (−).

An operation principle of the high-voltage control circuit 1P shown in FIG. 6 is the same as that of the high-voltage control circuit 1 shown in FIG. 3, and thus a description thereof is omitted.

According to Embodiment 4, similarly to Embodiment 2, it is possible to provide a high-voltage control circuit capable of shortening a time required for the voltage bucking with a simple configuration without requiring a complicated control algorithm.

In Embodiment 1 to Embodiment 4, a differential voltage supplied to the error amplifier 133 in the feedback circuit 103 is monitored by the amplifiers 105 and 109. When it is determined by the monitoring that absolute values of the command voltages Viv and Vivn are smaller than an absolute value of the DC high voltage Vot, electric charges accumulated in the smoothing capacitor 140 are discharged by the switch circuits 102 and 102P. Therefore, complicated control by an external signal is unnecessary. In addition, a complicated control algorithm using a processor or the like is also unnecessary, and it is possible to improve a speed when the DC high voltage is bucked only by decreasing an absolute value of a command voltage that determines a voltage value of the DC high voltage to be output. Since the switch circuits 102 and 102P are in a cut-off state during the voltage boosting, the voltage boosting can be performed at the same speed as in a case where the switch circuits 102 and 102P are not provided. Since the complicated control by the external signal and the complicated control algorithm are unnecessary, it is possible to simplify a configuration of a high-voltage control circuit.

In Embodiment 1 to Embodiment 4, examples in which a CW circuit is used as a high-voltage rectifier circuit are described, but the invention is not limited thereto. The high-voltage rectifier circuit may have a configuration in which a current flows in one direction by diode rectification.

The high-voltage control circuit according to Embodiment 1 to Embodiment 4 can be used in various high-voltage devices and high-voltage control circuits for medical applications, industrial applications, manufacturing applications, analysis applications, inspection and measurement applications, and the like. The high-voltage control circuit according to Embodiment 1 to Embodiment 4 can also be applied to an X-ray discharge tube power supply, a charged particle source power supply or an electrode control power supply of a charged particle beam device, a photomultiplier tube power supply, a discharge electrode power supply of a charge-removing device, an ion source power supply of a mass spectrometer, and the like.

Although the invention made by the present inventors is specifically described above based on the embodiments, the invention is not limited to the embodiments described above, and various modifications may be made without departing from the scope of the invention.

REFERENCE SIGNS LIST

1: high-voltage control circuit
100, 100P: high-voltage rectifier circuit
101: load
102, 102P: switch circuit
103: feedback circuit
104: control circuit
105, 109: amplifier
120: current limiter
140: smoothing capacitor
133: error amplifier
135: inverting amplifier
Vct: midpoint voltage
Vdf: differential voltage
Vdv: divided voltage
Viv, Vivn: command voltage
Vot: DC high voltage

The invention claimed is:

1. A high-voltage control circuit comprising:
a high-voltage rectifier circuit configured to convert an AC voltage into a DC high voltage;
a capacitor configured to smooth the DC high voltage output from the high-voltage rectifier circuit;
a switch circuit connected in parallel to the capacitor;
a feedback circuit including a first amplifier configured to amplify a differential voltage between a command voltage having a predetermined voltage value and a voltage value following the DC high voltage, and configured to control the high-voltage rectifier circuit based on an output signal of the first amplifier; and
a second amplifier configured to amplify the differential voltage, wherein
the switch circuit is controlled by an output signal of the second amplifier.

2. The high-voltage control circuit according to claim 1, wherein
the feedback circuit further includes a voltage divider configured to divide the DC high voltage, and
a difference between an output of the voltage divider and the command voltage is used as the differential voltage.

3. The high-voltage control circuit according to claim 2, wherein the feedback circuit further includes an inverting amplifier to which the DC high voltage is input as the voltage divider, and a difference between an output of the inverting amplifier and the command voltage is used as the differential voltage.

4. The high-voltage control circuit according to claim 1, wherein
the DC high voltage and the command voltage have different polarities with a predetermined reference voltage as a reference, and are synthesized via a resistance element, and
a midpoint voltage obtained by the synthesis is used as the differential voltage.

5. The high-voltage control circuit according to claim 1, wherein
the output signal of the second amplifier is supplied to the switch circuit via a current limiting resistance element,
the switch circuit includes
a transistor including a gate supplied with a predetermined voltage, a source, and a drain, and
a current controller connected in series to a path between the source and the drain of the transistor and configured to determine a value of a current flowing therethrough according to the output signal of the second amplifier supplied via the current limiting resistance element, wherein
the transistor and the current controller connected in series are connected in parallel to the capacitor.

6. The high-voltage control circuit according to claim 5, wherein
the transistor includes a plurality of transistors in which paths each between a source and a drain are connected in series to each other.

7. The high-voltage control circuit according to claim 1, wherein
the high-voltage rectifier circuit includes a Cockcroft-Walton circuit supplied with a pulse signal.

* * * * *